T. KARATSU.
ESTHESIOMETER.
APPLICATION FILED AUG. 20, 1917.
1,269,820.
Patented June 18, 1918.
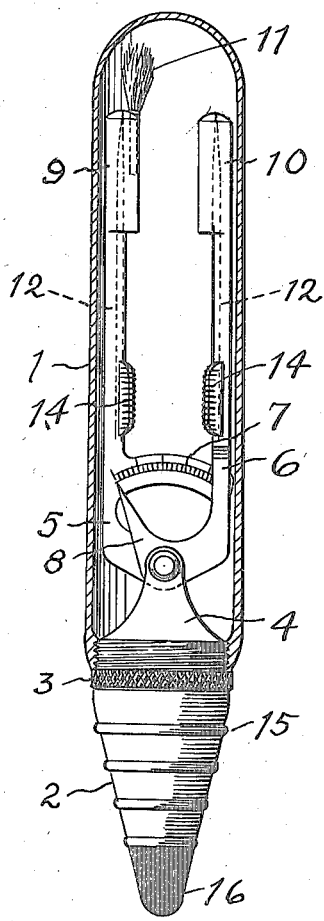
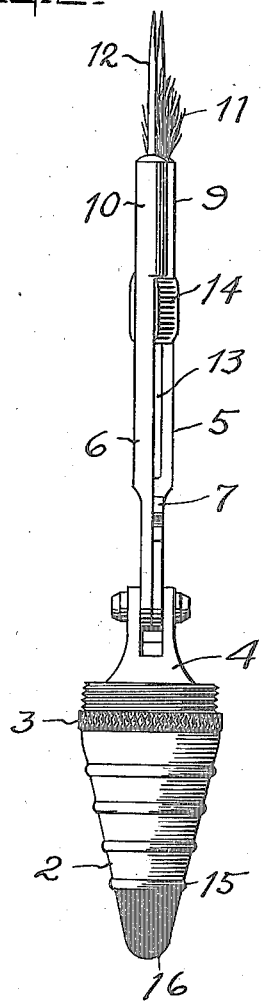
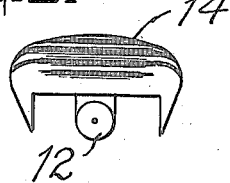
Tokumitsu Karatsu
INVENTOR.

UNITED STATES PATENT OFFICE.

TOKUMITSU KARATSU, OF LOS ANGELES, CALIFORNIA.

ESTHESIOMETER.

1,269,820.  Specification of Letters Patent.  Patented June 18, 1918.

Application filed August 20, 1917. Serial No. 187,072.

*To all whom it may concern:*

Be it known that I, TOKUMITSU KARATSU, a subject of the Emperor of Japan, residing at Los Angeles, in the county of Los Angeles and State of California, have invented a new and useful Esthesiometer, of which the following is a specification.

This invention relates to an improved surgical device having for its principal objects the provision of means for determining the linear measurements of cuts and wounds, means for determining the points of sensibility, and means to determine the degree of sensibility, all combined in one implement.

The device consists essentially of a detector comprising two divider points and a scale and pointer to indicate corresponding graduated distances, and a conveniently located brush to determine the degree of sensibility.

The invention also consists of certain parts and details and combinations of the same, as will be fully described hereinafter and pointed out in the claims.

In the drawings, Figure 1 is a side elevation of a surgical instrument embodying my invention, the casing therefor being in section; Fig. 2 is a side elevation of the device turned at an angle of ninety degrees; and Fig. 3 is an enlarged end view of the divider point and actuating shield therefor.

Referring to the drawings, the casing 1 is provided with a screw cap 2, having a knurled rim 3 to facilitate removal, and having a slotted lug 4, to which the divider legs 5, 6, are pivotally secured. The active extremities of the dividers are set at predetermined distances, gaged by the scale 7, and pointer 8, respectively, on divider members 5, 6.

Sensibility may be determined by employing either of the extremities 9, 10, and distance between points, by applying the extremities and reading the scale. The divider extremity 9 is provided with a hair tuft 11, by which the degree of sensibility may be determined, and the extremity 10 is rounded and adapted to be heated, and may be so treated before application.

The divider extremities are provided with extensible needle points 12, sliding in the grooves 13, and through the extremities, and adapted to be actuated by manual manipulation of the knurled members 14. To facilitate handling the cap is provided with transverse ribs 15, and the rounded end 16 may be employed as a percussor, being constructed of rubber; the divider legs being used as the handle.

What is claimed is:

1. In an esthesiometer, a pair of pivotally connected sensibility detectors, a handle therefor, and a casing for the detectors having screw connection with the handle.

2. In an esthesiometer, blunt-headed surface sensibility detectors, needle points slidably mounted in the detectors, means for manually projecting the needle points from the detectors, and a pivotal joint connecting the detectors to adapt them for linear measurement.

3. In an esthesiometer, a pair of dividers having rounded extremities, and means for projecting sensibility determining points from the extremities.

In testimony whereof I hereunto affix my signature this 10th day of August, in the year 1917.

TOKUMITSU KARATSU.

Witnesses:
 EDWARD M. KOJIMA,
 S. HATAYE.